United States Patent
Hunter

[15] 3,698,160
[45] Oct. 17, 1972

[54] MOTOR VEHICLE FUEL TANK VENTING

[72] Inventor: William A. Hunter, Royal Oak, Mich.

[73] Assignee: Chrysler Corporation, Highland Park, Mich.

[22] Filed: July 16, 1970

[21] Appl. No.: 55,543

[52] U.S. Cl. ................55/385, 55/419, 55/439, 55/466, 137/43, 220/85 VS
[51] Int. Cl. ................B01d 45/06, B65d 25/00
[58] Field of Search........55/385, 419, 439, 420, 466; 137/43; 123/119 B, 136; 220/85 VS, 44 R

[56] References Cited

UNITED STATES PATENTS

| | | |
|---|---|---|
| 3,187,935 | 6/1965 | Lenge....................220/86 R |
| 2,966,160 | 12/1960 | Forrester et al. ............137/43 |
| 3,389,715 | 6/1968 | Hebard et al. .............220/4 R |
| 3,500,843 | 3/1970 | White..........................137/43 |
| 3,517,654 | 6/1970 | Sarto et al..............123/119 R |
| 3,542,239 | 11/1970 | Latvala et al...........123/136 |
| 3,548,847 | 12/1970 | Roven.....................220/44 R |

FOREIGN PATENTS OR APPLICATIONS 1,175,097   7/1964   Germany....................55/385

*Primary Examiner*—Bernard Nozick
*Attorney*—Talburtt & Baldwin

[57] ABSTRACT

Positionally responsive valves mounted in a motor vehicle fuel tank and connected into part of the tank evaporative control vent system to aid in the separation of liquid fuel from vapor fuel in the vent system.

4 Claims, 5 Drawing Figures

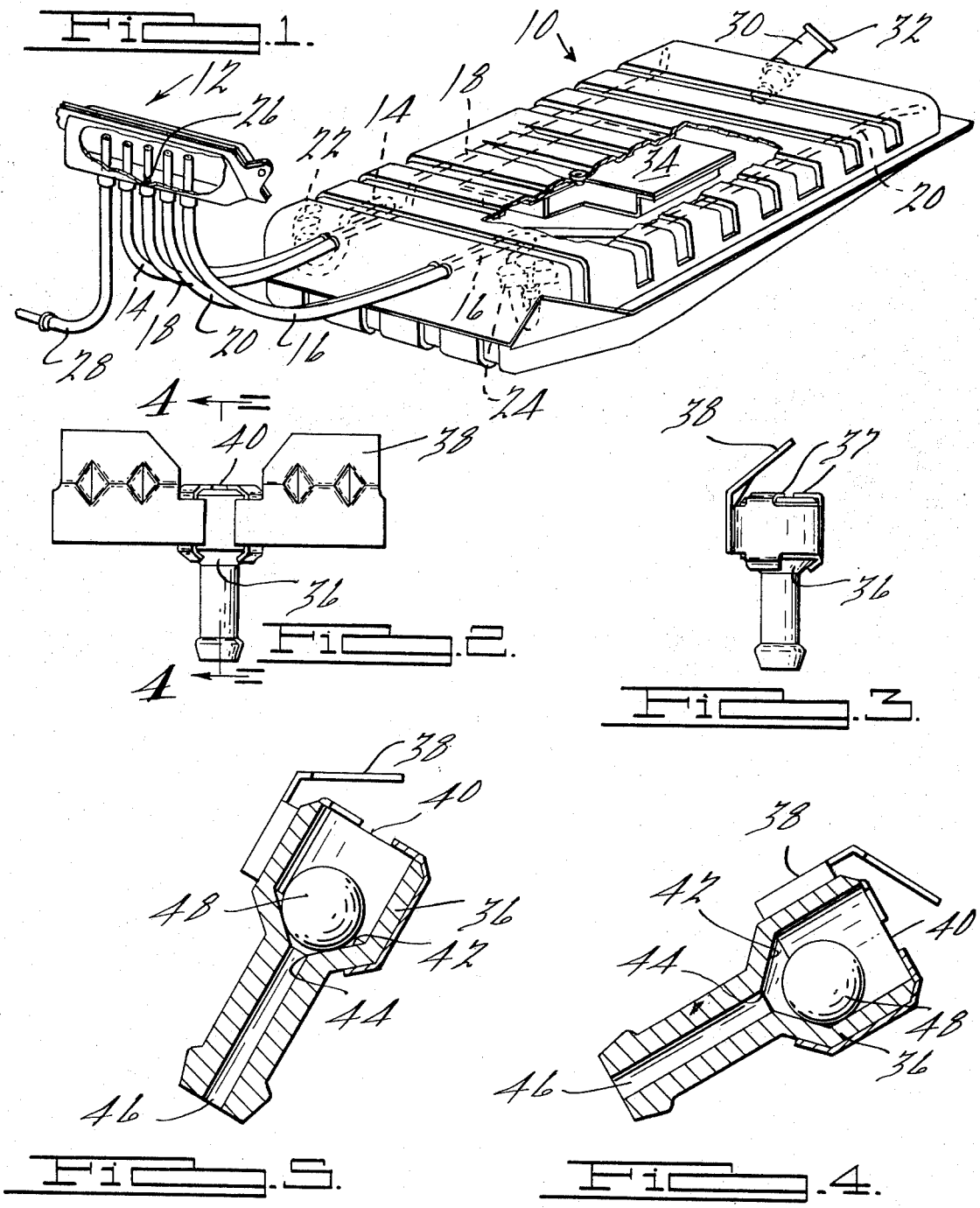

3,698,160

MOTOR VEHICLE FUEL TANK VENTING

BACKGROUND

This invention relates to fuel tank venting for motor vehicles. Evaporative losses of hydrocarbons from motor vehicle fuel tanks contribute significantly to the unburned hydrocarbons emitted to the atmosphere. As a result, there have been many attempts to contain these emissions by discontinuing the practice of venting motor vehicle fuel tanks directly to the atmosphere.

Today, motor vehicles include a fuel tank venting means for collecting and storing fuel vapors and for routing them to the engine when it is operating. The inter-connection of a fuel tank vapor venting system to the engine can result in liquid fuel carryover from the fuel tank which is undesirable. A liquid vapor separator of some sort is necessary to provide for vapor liquid separation with the vapor going to the engine and the liquid fuel draining back into the fuel tank from the separator. Factors that contribute to liquid fuel carryover are liquid and vapor thermal expansion, attitude of the vehicle, and maneuvering inertia forces.

One automobile manufacturer provides vents in the upper front corners of the fuel tank and a central vent at the upper rear portion of the fuel tank, the vents being connected into vent lines which lead to a liquid vapor separator mounted in the rear automobile "kick-up." The liquid vapor separator essentially consists of a container for receiving liquid fuel carried over the vent lines from the tank along with fuel vapor. Another vent line communicates between the liquid-vapor separator container and a vapor storage means, such as a charcoal canister. The separator container includes a float valve which acts to close the vent line leading to the vapor storage means when the liquid content in the container reaches a certain level. The closing of the ball valve prevents liquid fuel carryover to the rest of the evaporative control system on the motor vehicle. Liquid fuel in the container drains back to the fuel tank by means of a drain line.

Other manufacturers have provided vents in each of the upper corners of the fuel tank with connecting vent lines which lead to a standpipe arrangement. For example, at least one manufacturer has eliminated evaporative emission loss from the fuel tank by sealing it and conducting the fuel vapors generated therein to a vapor storage volume in the engine crankcase by way of a standpipe arrangement contained in the motor vehicle trunk.

In this arrangement four vent lines from the fuel tank terminate at varying heights in a standpipe type of liquid vapor separator which is carried in the vehicle trunk. The standpipe is in turn provided with a drain for returning liquid fuel carried over in the four vent lines back to the fuel tank. It is also provided with a vent line which leads to a vapor storage means, such as the engine crankcase.

The intrusion of vertical vents and a standpipe through the flat floor pan directly into the luggage space of the motor vehicle trunk above the fuel tank takes up luggage space, is vulnerable to damage and presents a poor appearance. The present invention decreases liquid fuel carryover to the liquid-vapor separator to a minimal amount not heretofore attained and eliminates the need for high vent lines and a standpipe arrangement inside the motor vehicle body.

SUMMARY OF THE INVENTION

This invention provides a fuel tank with vents extending from each of the upper corners of the tank and connected to a liquid-vapor separator container mounted in the motor vehicle kick-up. The two front vents in the fuel tank contain positionally responsive valves which are normally open when the vehicle is substantially level and closed when the vehicle assumes a downhill position. The valves may be designed to open and close at various predetermined angular positions as desired.

BRIEF DESCRIPTION OF THE DRAWING

FIG. 1 is a fragmentary perspective view of a motor vehicle fuel tank embodiment showing a vent system including a pair of positionally responsive valves and a liquid-vapor separator attached to the fuel tank by four vent lines.

FIGS. 2 and 3 are detailed elevational views of a positionally responsive valve.

FIGS. 4 and 5 are sectional views of the valve shown in FIGS. 2 and 3 in various operating positions, FIG. 4 showing the open position and FIG. 5 showing the closed position.

DESCRIPTION OF THE PREFERRED EMBODIMENTS

Referring now to the drawing, FIG. 1 shows an evaporative control system in accordance with this invention including a sealed fuel tank 10 having the general form of a rectangular parallelpiped and a liquid-vapor separator 12. Fuel tank 10 includes a filler pipe 30 which is sealed with a pressure-vacuum relief filler cap 32. Cap 32 may for example be of the standard well known type which provides vacuum relief at 7 to 14 inches of water and pressure relief at 14 to 18 inches of water. Fuel tank 10 also includes over-fill limiting means, such as fuel tank thermal expansion volume 34, which is necessary to prevent gasoline station attendants from completely filling the fuel tank in order to allow for thermal expansion during subsequent temperature increases and assure the presence of a space in the top of the tank for collecting fuel vapors. A 1.4 gallon container mounted at the inside top of the fuel tank as shown has been found sufficient for preventing overfilling. This overfill limiting device with a 1/16 inch orifice at the top and bottom (not shown) requires approximately 45 minutes to fill and therefore works very satisfactorily in preventing overfilling of the tank.

Liquid-vapor separator 12 is mounted higher than tank 10 as shown and may be conveniently positioned within the rear automobile "kick-up" (not shown). Fuel tank 10 includes vent means, such as the four vent lines 14, 16, 18 and 20 which are generally positioned in each of the upper fuel tank corners as shown. The open ends of the rear vent lines 18 and 20 opening into the tank serve as rear vent means for fuel vapors which tend to collect at the top of the tank. The two forward vent lines 14 and 16 serve as front vent means and include positionally controlled valve means, such as valves 22 and 24 respectively. These valves are normally open for venting fuel vapors when the tank and automobile are in a substantially horizontal position and are closed when the tank and automobile are in a downhill position. Vent lines 14, 16, 18 and 20 extend into liquidnvapor separator 12 as shown. One of the lines, for example 18, may be slotted near the separator floor as shown to provide a drain-back means 26 for the liquid-vapor separator by means of which liquid fuel carried over into the separator by the vent lines may be returned to the fuel tank. Liquid vapor separator 12 also includes an additional vent line 28 which communicates with the vapor storage means carried on the motor vehicle and may for example be the engine crankcase (not shown). Vapor collected in vapor liquid separator 12 from fuel tank 10 may thus pass over vent line 28 to be stored in the vapor storage means.

In operation, when the vehicle assumes a downhill attitude, valves 22 and 24 close thus preventing the flow of liquid fuel through vent lines 14 and 16 and avoiding the filling of liquid vapor separator 12 with liquid fuel. When vehicle assumes an uphill position, liquid fuel is unable to flow through any of the vent lines 14, 16, 18 or 20 since the liquid vapor separator 12 is above fuel tank 10. When the vehicle is canted to the left or right, valves 24 and 26 close. Since the forward vents are closed by valves 24 and 26 whenever liquid fuel carryover is possible, the only liquid fuel carryover to vapor liquid separator 12 which can occur is through rear vent lines 18 and 20. Only very small amounts of carryover are possible by these vent lines since they open into the upper rear corners of the tank and carryover does not occur in the downhill or uphill position of the motor vehicle. With the arrangement shown, the need for a lengthy standpipe is obviated and the liquid-vapor separator may be mounted in a lower position, such as within the "kick-up." Furthermore, the amount of liquid carryover is drastically limited.

A preferred positionally responsive valve used is shown in FIGS. 2 through 5 in more detail. The valve includes a valve body 36 and mounting bracket means 38 by means of which the valve may be mounted in the tank so as to be in the normally open position when the tank is substantially horizontal or in any desired predetermined position. Mounting may be accomplished by means other than a bracket. For example, a metal vent line may serve to hold the valve in a predetermined position within the tank.

Valve body 36 includes an open upper end 40 for receiving vapors from fuel tank 10. Opening 40 leads to a conical valve seat 42, best shown in FIGS. 4 and 5, which tapers to an open truncated lower end 44. Lower end 44 opens into a lower conduit 46 which is connected as shown in FIG. 1 to an appropriate vent line such as a rubber or metal tube. Valve seat 42 carries a spherical closure member or ball 48 in a freely rolling condition. Ball 48 is smaller in diameter than the upper end of seat 42 but larger in diameter than the lower end 44 of seat 42. It may be secured in the open end of valve body 36 by crimping the small ears of the bracket over the top of the valve body at several spots as shown in FIG. 3 at 37. The area of contact between the lower edge of upper end 40 and conical seat 42 serves as a peripheral abutment disposed about the upper end of the seat for limiting the movement of ball 48 as the attitude or position of valve body 36 is changed.

For example, when valve body 36 is oriented as shown in FIG. 4 the valve assumes its normally open position in which ball 48 rests at the upper end of conical valve seat 42 against the peripheral abutment and fuel vapors or the like may flow through the valve. As shown in FIG. 5, when valve body 36 is oriented in a relatively shallow angle from the vertical, ball 48 seats itself near the bottom of conical seat 42 and seals the truncated lower end 44 thus closing the valve and prohibiting the flow of fuel i.e., liquid or vapor, therethrough. It will be obvious that the positional response of the valve may be adjusted to open and close at various predetermined angles depending on the angular design of the conical valve seat and the relative size and weight of the ball closure member.

Valve body 36 may be made of any material such as metal or plastic. However, it is preferred that the valve seat 42 be made of an non-corrosive material such as brass and that the closure member 48 be made of a relatively heavy material such as brass also so as to be most responsive to positional changes.

The embodiments of the invention in which an exclusive property or right is claimed are defined as follows:

1. In a vented fuel tank system for motor vehicles of the type comprising:
  a fuel tank,
  front and rear vent means positioned in the upper portion of the tank for receiving vapor from the fuel therein,
  a liquid-vapor separator including a container for receiving vapor and carryover liquid fuel from the tank,
  vent lines extending between the vent means in the tank and the liquid-vapor separator for transmitting the vapor and liquid fuel from one to the other,
  drain-back means connected between the liquid-vapor separator and the fuel tank for returning liquid fuel from the separator to the tank, and
  vapor conduit means extending from the liquid-vapor separator for directing vapor to a vapor receiving means,
  the improvement comprising: positionally responsive valve means including a moveable valve-element carried by the front vent means for controlling the flow of vapor and liquid fuel into the front vent means, the valve means being normally open when the tank is in a substantially horizontal position and closed by said valve element when the tank is either downwardly inclined or canted to the side.

2. The combination according to claim 1 wherein the positionally responsive valve means comprises:
  at least one valve body including,
  a conical valve seat in the valve body defining an open upper end and tapering to an open truncated lower end smaller in diameter than the upper end,
  a peripheral abutment disposed about the upper end of the seat, and
  a freely rolling spherical closure member carried on the seat, the diameter of the closure member being smaller than the diameter of the upper end of the seat but larger than the diameter of the lower end of the seat.

3. The combination according to claim 1 wherein;
  the fuel tank has the general form of a rectangular parallelpiped, and
  the vent means comprises four vent lines, one opening into each of the four upper tank corners to provide a pair of front vents and a pair of open rear vents in the tank.

4. The combination according to claim 3 wherein the positionally responsive valve means comprises two valves, one being mounted on each of the front vent lines, each valve including:
  a valve body,
  a conical valve seat in the valve body defining an open upper end and tapering to an open truncated lower end smaller in diameter than the upper end,
  a peripheral abutment disposed about the upper end of the seat, and
  a freely rolling spherical closure member carried on the seat, the diameter of the closure member being smaller than the diameter of the upper end of the seat but larger than the diameter of the lower end of the seat.

* * * * *